（12）United States Patent
Tresser et al.

(10) Patent No.: US 10,478,004 B2
(45) Date of Patent: Nov. 19, 2019

(54) GRILLING PAN FOR COOKING PROTEINS

(71) Applicant: G.S. Blodgett Corporation, Burlington, VT (US)

(72) Inventors: Sarah J. Tresser, Williston, VT (US); Sean M. Preavy, Essex Junctioin, VT (US); Daniel J. Swayze, Colchester, VT (US)

(73) Assignee: G.S. Blodgett Corporation, Essex Junction, VT (US)

( * ) Notice: Subject to any disclaimer, the term of this patent is extended or adjusted under 35 U.S.C. 154(b) by 175 days.

(21) Appl. No.: 15/457,216

(22) Filed: Mar. 13, 2017

(65) Prior Publication Data

US 2017/0265672 A1    Sep. 21, 2017

Related U.S. Application Data

(60) Provisional application No. 62/310,052, filed on Mar. 18, 2016.

(51) Int. Cl.
| | |
|---|---|
| *A47J 27/00* | (2006.01) |
| *A47J 36/02* | (2006.01) |
| *B65D 25/04* | (2006.01) |
| *B65D 81/34* | (2006.01) |

(52) U.S. Cl.
CPC ............ *A47J 27/002* (2013.01); *A47J 36/02* (2013.01); *A47J 36/025* (2013.01); *B65D 25/04* (2013.01); *B65D 81/343* (2013.01)

(58) Field of Classification Search
CPC ...... A47J 27/002; A47J 37/0611; A47J 36/02; B65D 81/343; B65D 25/04; A45J 36/025
See application file for complete search history.

(56) References Cited

U.S. PATENT DOCUMENTS

| | | | |
|---|---|---|---|
| 2,720,157 A | 10/1955 | Harrison | |
| 3,669,006 A * | 6/1972 | Lee, Sr. | ............... A47J 37/0611 |
| | | | 425/298 |
| 5,701,804 A | 12/1997 | Liebermann | |
| 6,397,730 B1 | 6/2002 | Steinbach et al. | |
| 2006/0049169 A1 * | 3/2006 | Li | ........................ A47J 37/0611 |
| | | | 219/450.1 |

(Continued)

FOREIGN PATENT DOCUMENTS

| | | |
|---|---|---|
| AU | A-19262/83 | 3/1984 |
| EP | 1 920 689 A1 | 5/2008 |
| EP | 1 648 235 B1 | 1/2010 |

(Continued)

OTHER PUBLICATIONS

International Search Report and Written Opinion for PCT/US2017/022235, dated Sep. 13, 2017, 11 pp.

(Continued)

*Primary Examiner* — Andrew T Kirsch
*Assistant Examiner* — Don M Anderson
(74) *Attorney, Agent, or Firm* — Brinks Gilson & Lione

(57) ABSTRACT

A device for cooking proteins is provided. The device includes first and second pans. Each pan includes a base and an alignment wall. The bases each have a top surface with a non-stick coating. The alignment walls each include a cutout to provide a space for a food product to be disposed therein such that the top surface of the first and second pans cook a food product disposed therein.

20 Claims, 7 Drawing Sheets

(56) References Cited

U.S. PATENT DOCUMENTS

2016/0183720 A1\* 6/2016 Yan .................. A47J 37/0611
99/376
2017/0135159 A1\* 5/2017 Sorenson ............. A47J 37/0611

FOREIGN PATENT DOCUMENTS

| KR | 2010-0113921 | | 10/2010 |
| KR | 20100113921 A | \* | 10/2010 |
| KR | 2012-0008594 | | 12/2012 |
| WO | WO 2005/002342 A1 | | 1/2005 |
| WO | WO 2008/010639 A1 | | 1/2008 |
| WO | WO 2010/043827 A2 | | 4/2010 |
| WO | WO2015071700 A1 | \* | 5/2015 |

OTHER PUBLICATIONS

International Preliminary Report on Patentability and Written Opinion, International Application No. PCT/US2017/022235, dated Sep. 18, 2018, 7 pp.

\* cited by examiner

_US 10,478,004 B2_

GRILLING PAN FOR COOKING PROTEINS

CROSS REFERENCE TO RELATED APPLICATIONS

This application claims priority from U.S. Provisional Application No. 62/310,052, filed on Mar. 18, 2016, the entirety of which is hereby fully incorporated by reference herein.

TECHNICAL FIELD

This disclosure relates to devices configured to cook proteins, such as sausage patties, steaks, chicken, fish, or the like.

BRIEF SUMMARY

A first representative embodiment of the disclosure is provided. The embodiment includes a device for cooking proteins. The device includes a first pan comprising a first base and a first alignment wall, and a second pan comprising a second base and a second alignment wall. The first base and the second base are each metal with a top surface that includes a non-stick coating. The first alignment wall is disposed in surface-to surface contact with the top surface of the first base and the second alignment wall is disposed in surface-to-surface contact with the top surface of the second base. In use, the first and second bases are aligned such that an exposed planar surface of the first alignment wall makes surface-to-surface contact with an exposed planar surface of the second alignment wall. Each of the first and second alignment walls further comprise a plurality of cutouts that expose the top surface of the respective first and second bases, and the plurality of cutouts in the first alignment wall are disposed in registration with the plurality of cutouts of the second alignment wall when the first and second alignment walls make surface-to-surface contact with each other Advantages of the present disclosure will become more apparent to those skilled in the art from the following description of the preferred embodiments of the disclosure that have been shown and described by way of illustration. As will be realized, the disclosed subject matter is capable of other and different embodiments, and its details are capable of modification in various respects. Accordingly, the drawings and description are to be regarded as illustrative in nature and not as restrictive.

DETAILED DESCRIPTION OF THE DRAWINGS AND THE PRESENTLY PREFERRED EMBODIMENTS

Turning now to FIGS. 1-6, a device for cooking food products is provided. The device 10 may be specifically configured for cooking proteins (such as sausage patties, hamburgers, steaks, chicken, pork, fish, ham, and the like) such that the proteins are cooked within an oven, rather than on a griddle as is conventional. For the sake of brevity, the food product discussed herein with specific use of the device 10 is a sausage patty, although one of ordinary skill in the art will understand after a thorough review of the as-filed specification that the device can be implemented for various proteins, as well as other foods, such as vegetables, and specifically, the device may be used to cook any foods that may be commonly cooked upon a griddle or a frying pan.

Figure 1:
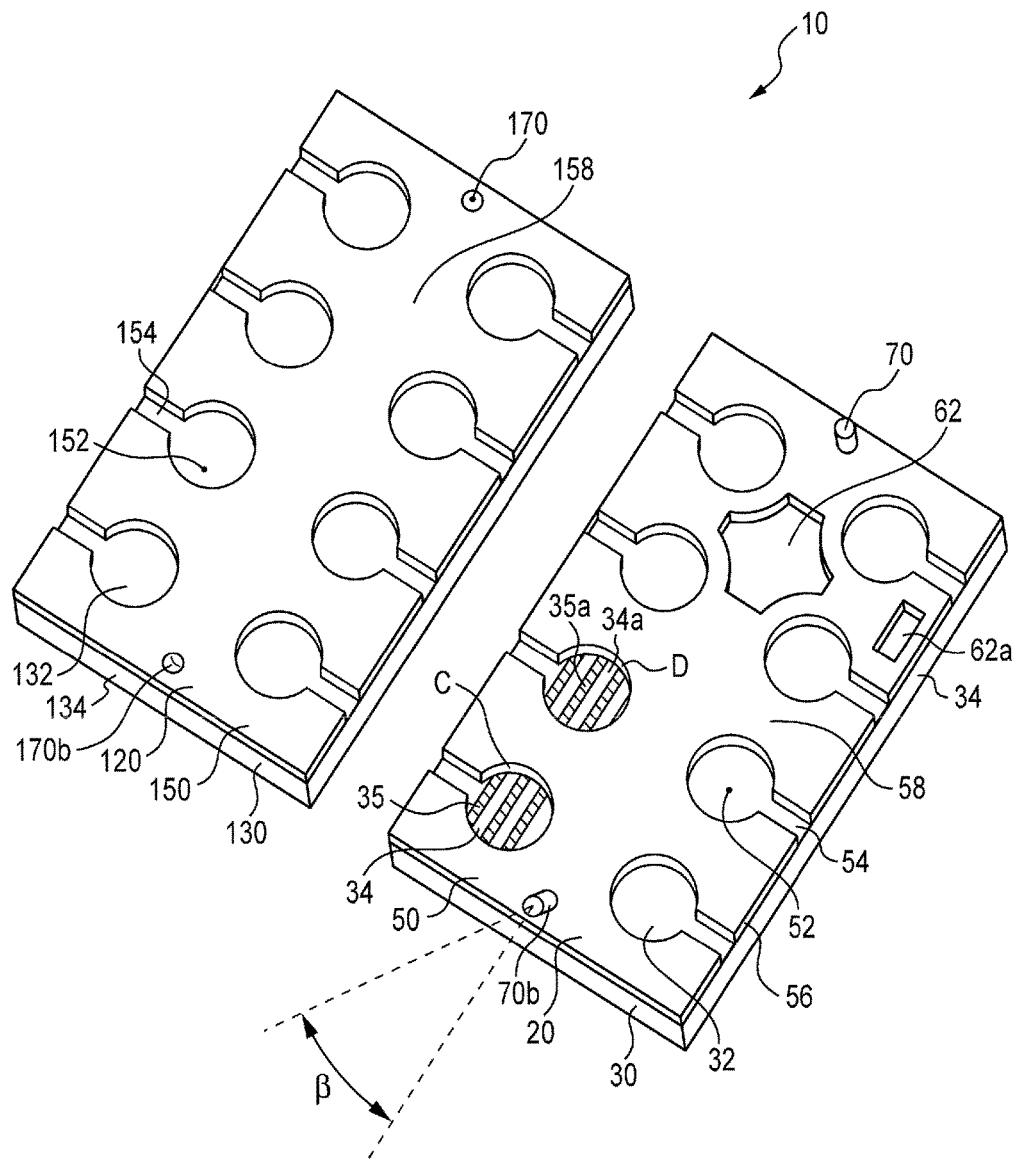
FIG. 1 is a perspective view of a device for cooking food products, such as proteins, with the first and second pans removed from each other.
Figure 6:
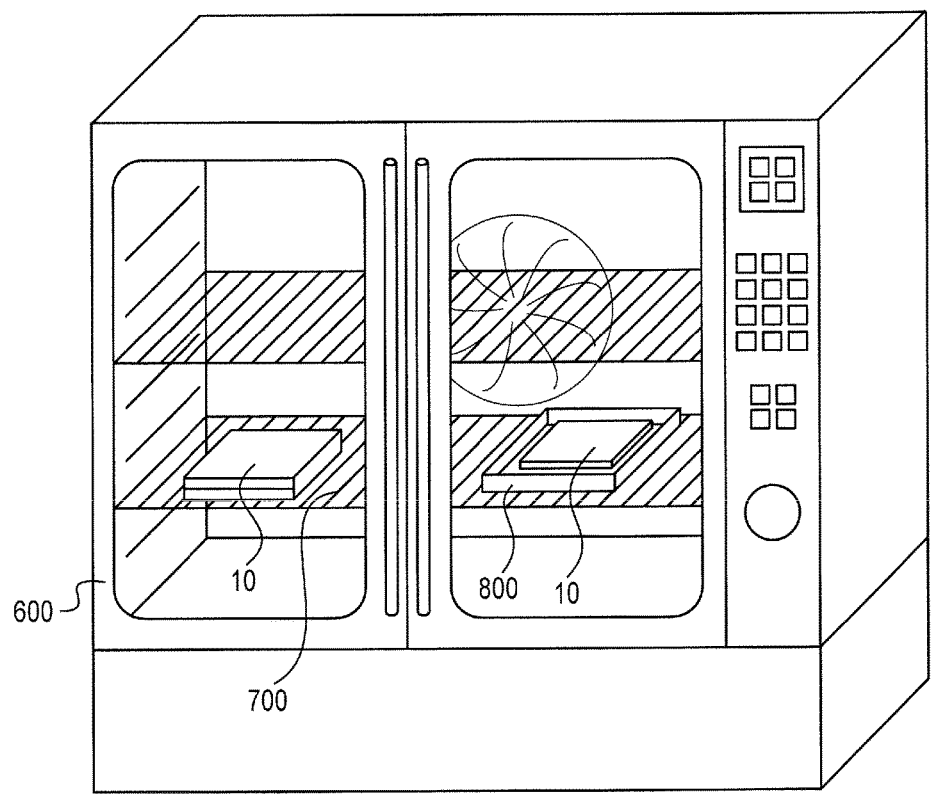
FIG. 6 is a schematic view of an oven that receiving two devices of FIG. 2 therein, one directly upon a rack of the oven, and the second within a restaurant pan that is disposed upon the rack.

With specific reference to FIG. 1, the device 10 is provided. The device 10 includes a first pan 20 and a second pan 120. Unless specifically described to the contrary below, the first and second pans 20, 120 are constructed in a like manner, and the components of the second pan that are similar to or the same as a corresponding component of the first pan are identified with a 1 before the element number of the component of the first pan (e.g. 30 and 130). The first and second pans 20, 120 are configured to be positioned one on top of each other, such that a food product that is disposed within a cutout 52 in the first pan is also enclosed within a corresponding cutout 152 in the second pan 120 when the second pan 120 rests upon the first pan 20. In this configuration, both opposite sides of the food product contact a cooking surface 32, 132 of the first and second pans 20, 120 such that both sides of the food product simultaneously receive heat by conduction from the respective pans 20, 120 for fast and consistent cooking, with the heat for cooking the food product being provided by an hot oven 600 when the pans 20, 120 are disposed within the cooking cavity of the oven (FIG. 6).

As mentioned above, the device 10 includes a first pan 20 and a second pan 120. The naming convention of "first" and "second" used herein references that the first pan rests upon the surface (such as an oven rack 700, or restaurant pan 800 that may be placed within an oven) and the second pan rests upon the first pan. One of ordinary skill will understand that this is a naming convention only, and in some embodiments, the second pan 120 of the device may be placed upon the oven rack or a restaurant pan within the oven.

The first pan 20 may be formed from a first base 30 and a first alignment wall 50. The first alignment wall 50 is fixed to the first base 30 with one or more fasteners, adhesive, welding or the like. The first base 30 includes a top surface 32, and edges 34 that define the side surfaces of the first base. The first base 30 may be made from aluminum, or alloys with aluminum that have a relatively high thermal conductivity. In some embodiments, portions of the first base 30 may be made from aluminum (such as the surface that supports the top surface 32) while other portions may be made from other materials for cost or weight, or other reasons.

The top surface 32 of the first pan 20 may be formed from a non-stick coating, or from a material that is relatively non-stick. In some embodiments, the top surface 32 may be coated with PTFE or other non-stick surfaces, such as silicone, nickel or chromium. In some embodiments, the base 30 may include a sol-gel coating, which is known to create a non-stick surface with similar performance of PTFE.

In some embodiments, the top surface 32 may be flat, while in some embodiments, all or a portion of the top surface 32 may have a plurality of ridges (34, 34a) and a plurality of valleys (35, 35a) that extend between the ridges 34, 34a. The ridges and valleys may have consistent widths (such that the width of each ridge 34 is the same as the width of each valley 35 (as shown in cutout C in FIG. 1) while in other embodiments, the width of the ridges 34a may be larger than the width of the valleys 35a (as shown in cutout D in FIG. 1). In some embodiments, all of the cutouts 52 on the first base may have the same configuration of the expose portions of the top surface 32 that have different profiles. As will be easily appreciated with a review of the subject specification, food products that contact the ridges 34 (34a) would be expected to have a different texture or appearance (such as "grill marks") than the areas of the food product that are positioned above the valleys 35 (35a).

The first base 20 additionally includes a first alignment wall 50 that is disposed above and may be in surface-to-surface contact with the top surface 32 of the first base 30. The first alignment wall 50 may be in surface-to-surface contact with the top surface 32 of the first base at all locations where the cutouts 52 and voids 54 are not formed, while in other embodiments only portions of the first alignment wall 50 make surface-to-surface contact.

In some embodiments, the first alignment wall 50 may be formed with various apertures 62 between the walls defining the cutouts 52 and the voids 54. The apertures 62, 62a may allow for the first alignment wall 50 to be formed with less material (while still retain the necessary strength and heat transfer properties) to reduce the cost and weight of the first base 20. FIG. 1 depicts the apertures 62 and 62a schematically between cutouts 52 and voids 54, and one of ordinary skill that apertures of different sizes, shapes, and positions within the first alignment wall 50 may be provided.

The first alignment wall 50 may be formed from aluminum or alloys of aluminum, or the same or a similar material as the base 30, such that the first base 30 and the first alignment wall 50 react similarly when heating up and cooling down (such as thermal contraction/expansion). In other embodiments, the first alignment wall 50 may be formed from steel, high temperature plastic, or other materials that can handle high temperatures (both continuously and cyclically) in order to substitute from aluminum for cost considerations, because a significant percentage of the heat transferred to the food product disposed within the cutout 52 is transferred thereto from the first base 30 (and second base 130) and not the alignment walls 50, 150. In alternative embodiments, the first alignment wall 50 may be made from a material with a relatively low thermal conductivity, such that a significant portion of heat transferred to the base 30 is ultimately transferred to the food product disposed within the cutout 52, rather than to the first alignment wall 50.

The first alignment wall 50 is provided to establish a set off distance from the corresponding second pan 120, and specifically the top surface 132 of the second base 130 of the second pan 130 (in combination with the second alignment wall 150, when provided). The second alignment wall 150 is fixed to the second base 130 with one or more fasteners, adhesive, welding or the like. In some embodiments, the first alignment wall 50 may have a thickness that is approximately half of the height thickness of the food product that is expected to be placed within the cutout 52 for cooking by the pans. For example, in embodiments where the device 10 is configured to cook sausage patties, the thickness of the first alignment wall 50 is one half of the thickness of a sausage patty when fully cooked (or just prior to fully cooking).

The top surface 58 of the first alignment wall 50 may be flat to allow the top surface 158 of the second alignment wall 150 to rest thereon with surface-to-surface contact when the second pan 120 is placed upon the first pan 20.

In some embodiments, the first alignment wall 50 may support one or more pegs 70 that extend upward to provide for alignment with corresponding holes 170 that are provided through the second alignment wall 150. In other embodiments, the holes may be provided on the first alignment wall and the pegs may extend from the second alignment wall. In embodiments where the first and second pans 20, 120 are attached with hinge (discussed below), the peg(s) (70b, FIG. 1) may be disposed at an acute angle β with respect to the top surface of the first alignment wall 50, and the hole(s) 170b may be disposed at a similar acute angle β, to provide clearance for the peg 70b as the second pan 120 pivots toward contact with the first pan 20.

The first alignment wall 50 defines one or a plurality of cutouts 52 that allow the top surface 32 of the base to be exposed, such that a food product can be disposed within the cutout 52 and contact the top surface of the first base 30. The cutouts 52 may be circular to receive a specific food product (with the exception of the portion missing where the void 54, when provided, interacts with the cutout 52), such as shaped to receive a circular sausage patty, or rectangular or squire to receive one or more elongate sausage links, or another shape, such as elliptical or oval. In some embodiments, the device 10 is configured to receive frozen food products, and therefore the cutouts 52 are formed with a size to fit the frozen size of the food product with the understanding that the food product may reduce in size when cooked. In some embodiments, the first alignment wall 50 may include 4, 6, 8, 10, or another number of cutouts 52 to allow a plurality of individual food products to be cooked simultaneously.

In some embodiments, some or all of the cutouts 52 transition to a void 54 that extends to the edge 56 of the first alignment wall 50. The void exposes the top surface 32 of the first base 30, and may be provided to allow for gaseous and fluid communication between the cutout 52 and the environment to allow for drainage of fluid or flow of gas from the cutout to the environment (within the cooking compartment of the oven 600), or the ambient when the device 10 is removed from the oven 600. In some embodiments, the width of the void 54 is less than the diameter of the cutout 52 (or a major or minor width when the cutout 52 is not circular), such as half the diameter (width) of the cutout, a quarter of the diameter (width) or other possible ratios. One of ordinary skill with a thorough review of this application will understand that the relative size of the void 54 with respect to the cutout 52 will be a function of various aspects, such as the foreseen drainage from the food when being cooked, the desire to limit the material used to form the first alignment wall, the distance of the cutout 52 from the edge 56, the need of the walls of the first alignment wall 50 forming the cutout to support the sides of the food product as it is being cooked, and therefore choosing the relative size and shape of the void 54 of the void will be only one of routine optimization.

In some embodiments, all of the cutouts 52 within the first alignment wall 50 may be the same size and shape, while in other embodiments, the size and/or shape of the cutouts 52 may vary either to allow the device to simultaneously cook food products with different size/shape, or due to the different thermal performance of the device for cooking food products at different positions within the top surface 32, which would be understood with a review of this disclosure with only routine experimentation and optimization.

In some embodiments, second pan 120 may be constructed in the same manner as the first pan 20. The second pan 120 may be formed with a second base 130 and a second alignment wall 150 that is mounted upon the top surface 132 of the second base 130. The "top surface" 132 is defined to be the surface that faces upward (or outward) when the device is opened in order to place or remove a food product from the cutout 52 associated with the first pan 20 (e.g. the position of FIG. 1, 4, or 5). When the device 10 is in the cooking configuration, the "top surface" of the second pan 120 faces downward toward the first pan.

In some embodiments, the second base 130 may be formed exactly like the first base 30. In other embodiments, the second base 130 may have size or shape differences from the first base 30, such as thickness differences that may necessitated for consistent cooking of the top side of the food product, or necessitated if the oven may provide heat in a non-uniform manner within the oven cavity (such as if the burners are only on the top or the bottom of the oven).

In some embodiments, the second base 130 is formed from the same material as the first base 30, or for similar reasons as discussed above with respect to the size and shape of the second base 130, the second base 130 may be formed from a different material than the first base 30. The top surface 132 of the first base may be formed from a non-stick coating, which may be the same material as used to provide the non-stick coating of the top surface 32 of the first base 30.

Similar to the first base, the top surface 132 of the second base may be completely flat, while in some embodiments, all or a portion of the top surface 132 of the second base may be formed with a plurality of ridges and valleys 134 (similar to those discussed with respect to the first base 30).

The second alignment wall 150 may be formed in the same manner as the first alignment wall 50, discussed above. The thickness of the second alignment wall 150 maybe about one half of the expected thickness of the food product that is to be received within the cutouts 52, 152, which may be the thickness when frozen, the thickness when just positioned upon the pans, or the final cooked thickness. In other embodiments, the thickness may be just less than one half of the total thickness of the food such that initially the second pan will be slightly raised off of the first pan, and therefore the weight of the second pan will rest upon the food product to act to compress the food product disposed within the cutout.

The second alignment wall 150 may include one or a plurality of cutouts 152 that are configured to provide space for a food product to contact the top surface 132 of the second base 130 (when the second pan 120 is disposed upon the first pan 20 with the respective first and second alignment walls 50, 150 making surface-to-surface contact).

In some embodiments, the second cutouts 152 may be provided upon the second alignment wall 150 in the same position as the cutouts on the first alignment wall 50. Further, in some embodiments, the cutouts 152 may be formed with the same size and shape as the corresponding cutouts 52 on the first alignment wall 50. Alternatively, the cutouts 150 in the second alignment wall 150 may be a different size (or shape) than the cutouts 52.

In some embodiments, the second alignment wall 150 may include voids 154 that extend from one, some, or all of the cutouts 152 to the edge 156 of the second alignment wall, with the void 154 performing the same function as the voids 54 on the first alignment wall 50. In other embodiments, the second alignment wall 150 may be formed without voids that extend between the cutouts 152 and the side wall 156.

Figure 2:
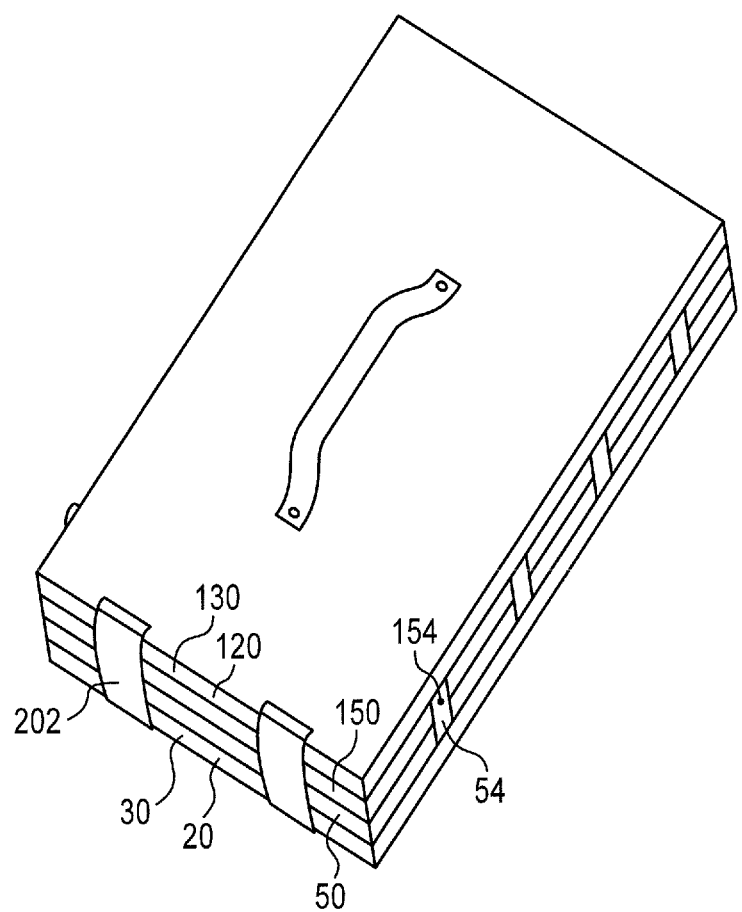
FIG. 2 is a perspective view of a device for cooking food products, with the second pan disposed upon the first pan.
Figure 2A:
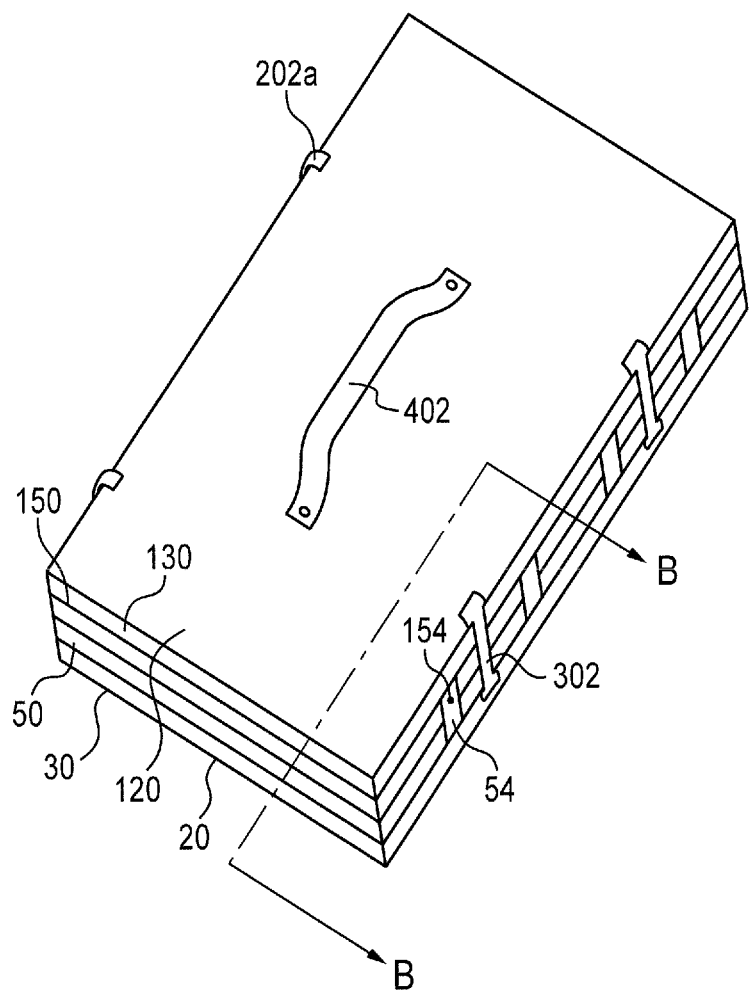
FIG. 2a is a perspective of an alternate hinge used with the device of FIG. 2.
Figure 3:
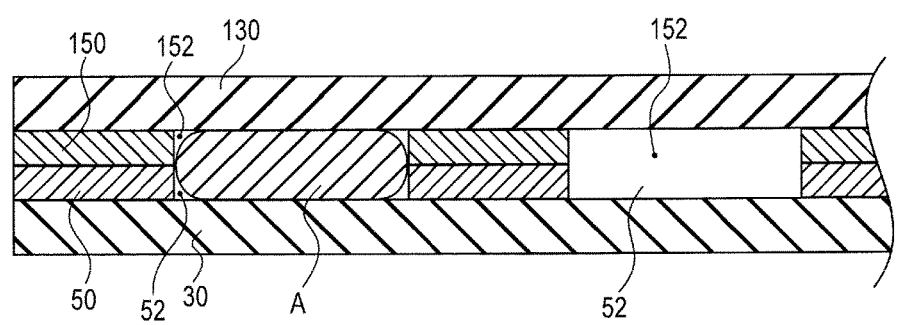
FIG. 3 is a cross-sectional view of the section B-B of FIG. 2a depicting a food product disposed between the first and second pans.
Figure 4:
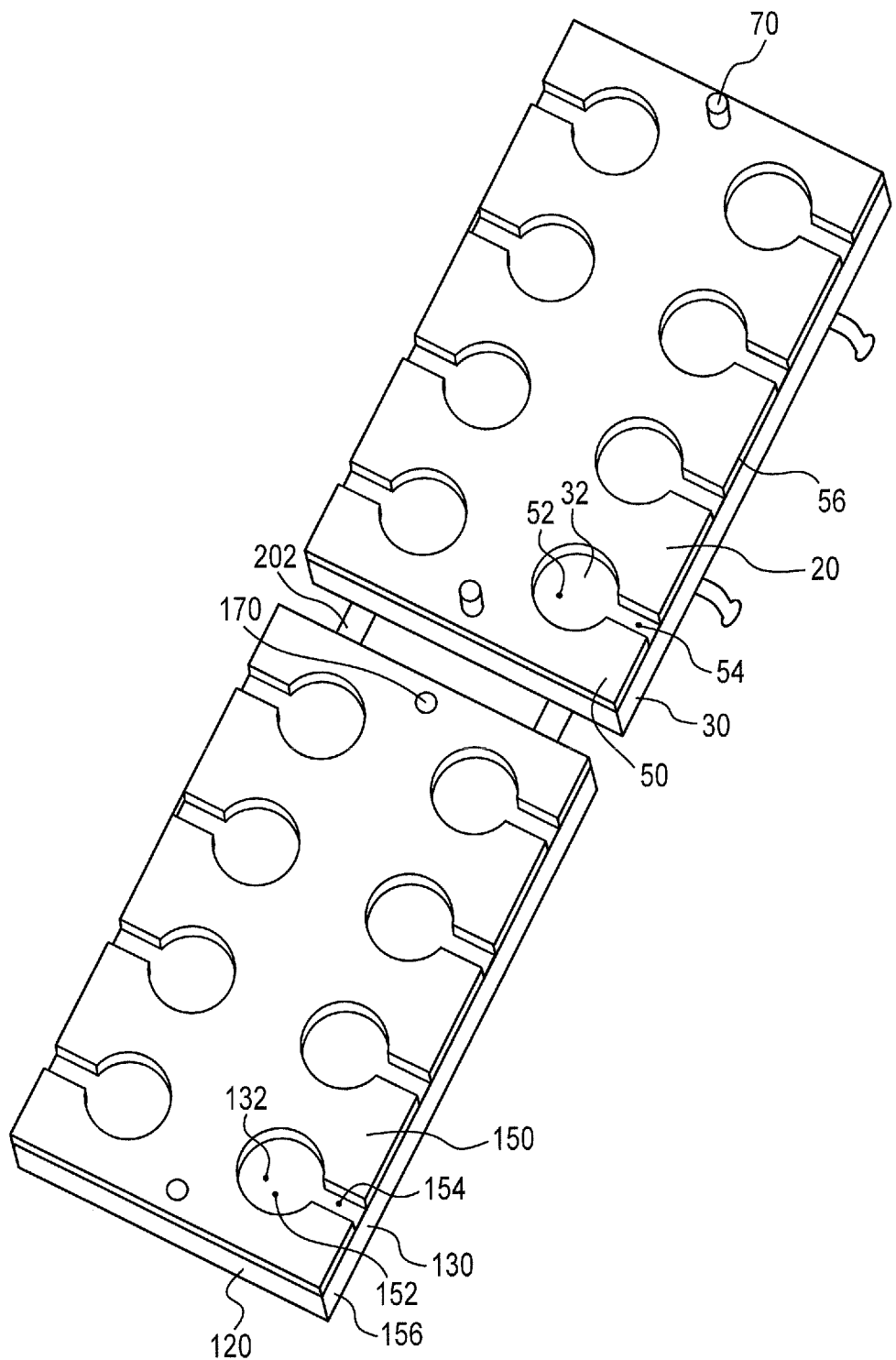
FIG. 4 is a view of the device of FIG. 2, depicting the second pan pivoted away from the first pan and disposed such that both the first and second pans rest upon the same flat surface.

In some embodiments, the first and second pans 20, 120 may be separate components that are not attached together (when not paced on top of each other). In other embodiments, the first and second pans 20, 120 may be connected with one or more hinges 202, 202a that attach the two pans together, and allow the second pan 120 to pivot with respect to the first pan 20 between a closed position (FIGS. 2, 2a) where the first and second alignment walls 50, 150 make surface-to-surface contact, to a second open position (FIGS. 4, 5) where the first and second alignment walls are exposed. In embodiments where the first and second pans are rectangular, the hinges 202 may be disposed upon the shorter wall (FIG. 2) or the longer wall (FIG. 2a).

Figure 5:
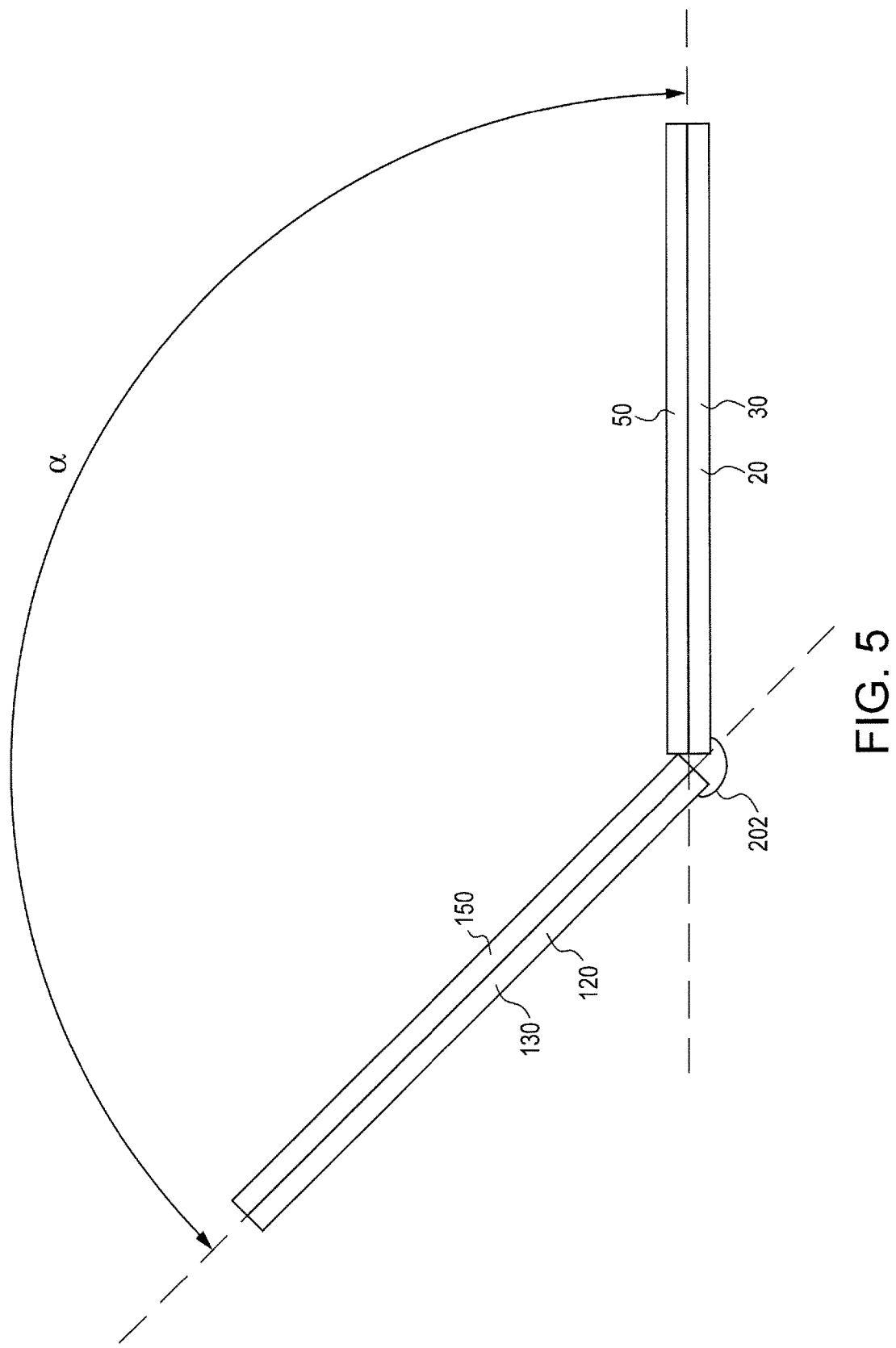
FIG. 5 is a side view of the device of FIG. 2, depicting the second pan held at an obtuse angle with respect to the first pan.

In some embodiments, the hinge (202, 202a) may be configured to allow the second pan 120 to pivot with respect to the first pan 20 such that the first and second pans both rest upon the same planar surface when the second pan 120 is in the open position. In other embodiments, the hinge (202, 202a) is configured to limit the range of potential pivoting of the second pan 120 with respect to the first pan 20, such that the second pan 120 is maintained at an obtuse angle α with respect to the first pan 20 (FIG. 5). In some embodiments, the hinge is configured to maintain the second pan 120 in the obtuse angle α without the operator holding the second pan 120.

In some embodiments, a latch 302 may be provided to maintain the second pan 120 in the closed position with respect to the first pan 20. The latch may be an arm that is fixed to the first pan (such as the side surface 34 of the first base) and is biased to engage the second base 130 of the second pan 120. The latch 302 may be biased toward the second pan 120 with a spring or based upon the construction of the latch lever itself. The latch 302 may be slid or rotated away from engagement with the second pan 120 to allow the second pan 120 to be pivoted to the second position. In some embodiments, the second pan 120 may include a handle 402 to allow the user to manipulate the second pan 120 to pivot the second pan 120 with respect to the first pan 20, and when the latch 302 is engaged, to carry the device (in the closed position) with one hand by the handle.

While the preferred embodiments of the disclosed have been described, it should be understood that the invention is not so limited and modifications may be made without departing from the disclosure. The scope of the disclosure is defined by the appended claims, and all devices that come within the meaning of the claims, either literally or by equivalence, are intended to be embraced therein.

The invention claimed is:

1. A device for cooking proteins, comprising:
a first pan comprising a first base and a first alignment wall, and a second pan comprising a second base and a second alignment wall,
wherein the first base and the second base each include a top surface that includes a non-stick coating,
wherein the first alignment wall is disposed in surface-to surface contact with the top surface of the first base and the second alignment wall is disposed in surface-to-surface contact with the top surface of the second base,
wherein, in use, the first and second bases are aligned such that an exposed planar surface of the first alignment wall makes surface-to-surface contact with an exposed planar surface of the second alignment wall, wherein each of the first and second alignment walls further comprise a plurality of cutouts that expose the top surface of the respective first and second bases, and the plurality of cutouts in the first alignment wall are disposed in registration with the plurality of cutouts of the second alignment wall when the first and second alignment walls make surface-to-surface contact with each other, wherein cutouts of the plurality of cutouts of the respective first and second alignment walls are isolated from each other so as to block a food product from flowing from one cutout to another cutout of the plurality of cutouts, and wherein each of the plurality of cutouts in the first and second alignment walls include a void that extends from the respective cutout to a side edge of the respective alignment wall, and the top surface of the respective first or second base is exposed below each void.

2. The device for cooking proteins of claim 1, wherein each of the plurality of cutouts in the first alignment wall have the same size and shape.

3. The device for cooking proteins of claim 2, wherein each of the plurality of cutouts in the second alignment wall have the same size and shape.

4. The device for cooking proteins of claim 1, wherein each of the plurality of cutouts in the first alignment wall and each of the plurality of cutouts in the second alignment wall have the same size and shape.

5. The device for cooking proteins of claim 1, wherein each of the voids has a width that is less than a diameter of the cutout.

6. The device for cooking proteins of claim 1, wherein each of the cutouts are circular.

7. The device for cooking proteins of claim 1, wherein the first and second bases are aluminum.

8. The device of claim 1, wherein the first pan comprises one or more alignment pins that extend upwardly from the first alignment wall, and the second pan comprises a corresponding number of holes that are aligned to accept the one or more alignment pins therein when the first and second alignment walls make surface-to-surface contact with each other.

9. The device for cooking proteins of claim 1, wherein the first base includes a planar exposed surface below each of the plurality of cutouts of the first alignment wall.

10. The device for cooking proteins of claim 1, wherein the first base includes a slotted exposed surface below each of the plurality of cutouts of the first alignment wall, such that, in use, only upstanding surfaces of the slots contact the surface of a relatively flat food product when disposed thereon.

11. The device for cooking proteins of claim 1, wherein the non-stick coating comprises a coating selected from PTFE, sol-gel, silicone, nickel, or chromium.

12. The device for cooking proteins of claim 1, wherein the non-stick coating comprises a sol-gel coating.

13. The device for cooking proteins of claim 1, wherein the first and second pans, when aligned are configured to rest upon a rack within an oven.

14. The device for cooking proteins of claim 1, wherein the first and second pans, when aligned, are configured to rest within a baking pan.

15. The device for cooking proteins of claim 1, wherein the second pan comprises a handle that extends from the second base and is configured to allow a user to lift and place the second pan with respect to the first pan with a single hand.

16. The device for cooking proteins of claim 1, wherein the first and second pans are connected together by a hinge, wherein the hinge allows the second pan to pivot with respect to the first pan between a closed position, where the respective first and second alignment surfaces make surface-to-surface contact, and to a second open position where the first alignment surface is exposed.

17. The device for cooking proteins of claim 16, wherein the second pan is configured to rest upon a planar surface with the first pan when the second pan is in the second open position.

18. The device for cooking proteins of claim 16, wherein the second pan is disposed and remains at an obtuse angle with respect to the first pan when in the second open position without the operator holding the second pan.

19. The device for cooking proteins of claim 1, wherein one or both of the first and second pans comprises a clip that is configured to latch onto the opposite pan as the second pan is urged to a position where the first and second alignment surfaces make surface to surface contact with each other, wherein when the clip is latched to the opposite pan the surface-to-surface contact between the first and second alignment surfaces is maintained.

20. The device for cooking proteins of claim 1, wherein one or both of the first and second pans comprises a clip that is configured to latch onto the opposite pan as the second pan is urged to a position where the first and second alignment surfaces make surface to surface contact with each other, wherein when the clip is latched to the opposite pan the surface-to-surface contact between the first and second alignment surfaces is maintained.

* * * * *